(12) United States Patent
Rajkumar et al.

(10) Patent No.: US 11,268,464 B2
(45) Date of Patent: Mar. 8, 2022

(54) ENGINE CONTROL UNIT (ECU) AND METHOD TO ADAPT THE ECU FOR TRIGGER WHEEL IRREGULARITIES

(71) Applicants: Robert Bosch GmbH, Stuttgart (DE); Bosch Limited, Bangalore (IN)

(72) Inventors: Jeswin Samuelraj Goodwin Rajkumar, Tamilnadu (IN); Bijith Thiruvappallil Gangadharan Pillai, Kerala (IN); Puthuparambil Krishnadas Abhilash, Kerala (IN)

(73) Assignees: Robert Bosch GmbH, Stuttgart (DE); Bosch Limited, Bangalore (IN)

( * ) Notice: Subject to any disclaimer, the term of this patent is extended or adjusted under 35 U.S.C. 154(b) by 112 days.

(21) Appl. No.: 16/525,031

(22) Filed: Jul. 29, 2019

(65) Prior Publication Data

US 2020/0032723 A1 Jan. 30, 2020

(30) Foreign Application Priority Data

Jul. 30, 2018 (IN) .............................. 201841028587

(51) Int. Cl.
*F02D 41/00* (2006.01)
*G01M 15/06* (2006.01)

(52) U.S. Cl.
CPC .......... *F02D 41/009* (2013.01); *G01M 15/06* (2013.01); *F02D 2250/14* (2013.01)

(58) Field of Classification Search
CPC .. F02D 41/009; F02D 2250/14; F02D 41/222; F02D 2200/101; G01M 15/06; Y02T 10/40
See application file for complete search history.

(56) References Cited

U.S. PATENT DOCUMENTS

| | | | | |
|---|---|---|---|---|
| 9,297,321 B2* | 3/2016 | Hawken | ................ | F02D 41/009 |
| 9,765,711 B2* | 9/2017 | Martinson | ............ | G01D 5/2455 |
| 10,236,815 B2* | 3/2019 | Pietromonaco | ........ | H02K 11/21 |
| 2003/0037767 A1* | 2/2003 | Breitegger | ............ | F02D 41/009 |
| | | | | 123/406.58 |
| 2004/0172835 A1* | 9/2004 | Klarer | .................... | G01B 5/255 |
| | | | | 33/203 |
| 2007/0044548 A1* | 3/2007 | Ishizuka | ............... | F02D 41/123 |
| | | | | 73/114.26 |
| 2009/0056429 A1* | 3/2009 | Avallone | ............... | B60W 50/04 |
| | | | | 73/114.26 |

(Continued)

*Primary Examiner* — Joseph J Dallo
*Assistant Examiner* — Kurt Philip Liethen
(74) *Attorney, Agent, or Firm* — Maginot, Moore & Beck LLP

(57) ABSTRACT

An Engine Control Unit (ECU) for adapting to irregularities in a trigger wheel includes a memory element that stores a table with data of dimensions of the trigger wheel. The ECU is configured to (i) use a position sensor to detect a tooth and a corresponding tooth number, and (ii) set a time range for detection of a subsequent tooth with reference to the data in the memory element. The ECU is further configured to (iii) prevent errors due to irregularities in the trigger wheel in order to reinforce the ECU or an Engine Position Management System (EPMS) by adapting to a profile of each tooth of the trigger wheel, and in order to avoid an error in a plausibility check of the position sensor due to irregularities in the trigger wheel.

11 Claims, 2 Drawing Sheets

(56) References Cited

U.S. PATENT DOCUMENTS

| | | | |
|---|---|---|---|
| 2011/0290010 A1* | 12/2011 | Fulks | F02D 41/009 73/114.26 |
| 2013/0269415 A1* | 10/2013 | Fayyad | G01M 15/06 73/1.79 |
| 2013/0275022 A1 | 10/2013 | Fayyad et al. | |
| 2014/0034000 A1* | 2/2014 | Baumann | F02D 41/009 123/90.17 |

* cited by examiner

ENGINE CONTROL UNIT (ECU) AND METHOD TO ADAPT THE ECU FOR TRIGGER WHEEL IRREGULARITIES

This application claims priority under 35 U.S.C. § 119 to patent application number IN 201841028587 filed on Jul. 30, 2018 in India, the disclosure of which is incorporated herein by reference in its entirety.

TECHNICAL FIELD

The present disclosure relates to an Engine Control Unit (ECU) and method to adapt the ECU for trigger wheel irregularities.

BACKGROUND

A trigger wheel with predefined tooth configuration (e.g. 24-2) is mounted on a crankshaft. These teeth are to be placed at equal distance on the trigger wheel. A crankshaft sensor provides signal from this trigger wheel to an Engine/ Electronic Control Unit (ECU). This is the very basic and most critical input for the ECU or the Engine Position Management System (EPMS). Any error associated with this signal results in loss of synchronization between the ECU and the engine and in vehicle stalling.

The EPMS processes these crankshaft signals and calculates the tooth time and the tooth count. The tooth time depends on the tooth width and crankshaft rotation speed. Ideally, every tooth must be equally spaced on the trigger wheel. The EPMS does a plausibility check of crankshaft sensor signal using the tooth time and engine speed. For this, using the previous tooth time, a minimum and maximum tooth time of upcoming/subsequent tooth is defined. If the next tooth falls outside the time range, the signal is treated as non-plausible signal and synchronization is reset. This is also possible due to very high acceleration and deceleration or due to the error associated with the crankshaft sensor itself.

The plausibility check is calibrated with trigger wheel and depends on the particular engine's maximum acceleration and deceleration. Also a safety buffer is given based on the tolerance of the trigger wheel. Most of the times, the tolerance exceeds the specification during the mass production. The space between teeth may be not uniform or the width of the teeth may not be uniform and creates irregularity. Here the plausibility check fails and the vehicle stalls. Also, the plausibility check is a must and cannot be avoided.

According to a prior art US20130275022 an engine crank signal correction method and controller is disclosed. An engine control module and method configured to correct an engine crank sensor signal for errors in an apparent location of a tooth edge on a crank wheel is provided. A correction factor is determined based on a first formula if a comparison of adjacent pulse intervals to predetermined thresholds indicates that a tooth edge appears to be abnormally late, and determined based on a second formula if a comparison of adjacent pulse intervals to other predetermined thresholds indicates that a tooth edge appears to be abnormally The correction factor is set to a null value if the correction factor is not determined based on the first formula or the second formula; and operating an engine based on the correction factor.

BRIEF DESCRIPTION OF THE DRAWINGS

An embodiment of the disclosure is described with reference to the following accompanying drawing.

DETAILED DESCRIPTION OF THE EMBODIMENTS

Figure 1:
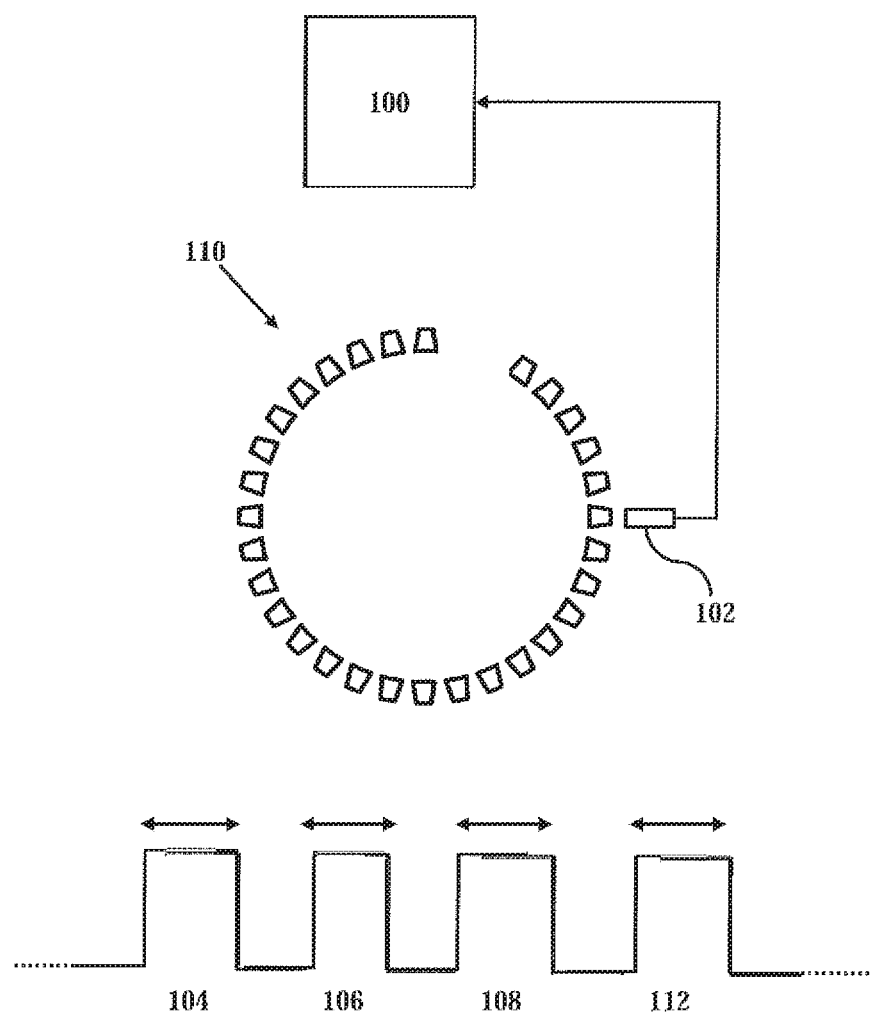
FIG. 1 illustrates an Engine Control Unit (ECU), according to an embodiment of the present disclosure.

FIG. 1 illustrates an Engine Control Unit (ECU), according to an embodiment of the present disclosure. The ECU 100 is provided to adapt for the irregularities in the trigger wheel 110. The trigger wheel 110 is also referred to as crankshaft wheel or tooth wheel which is coupled to a crankshaft of an engine of a vehicle. The ECU 100 is configured to detect a tooth 120 and corresponding tooth number by using a position sensor 102, and set a time range for the detection of a subsequent tooth 120 using a data from a table storing dimensions of the trigger wheel 110. The table is stored in a memory element of the ECU 100. If the tooth 120 is not detected within the corresponding set e range, then the ECU 100 determines the position sensor 102 to be faulty.

The dimensions of the trigger wheel 110 comprises tooth number and corresponding actual tooth width measured and learned in a dynamometer. The dimensions are measured at a constant engine speed without fueling in the dynamometer. Also, the space between every tooth is measured and learned by the ECU 100 and then stored in the table as the error pattern in the trigger wheel 110 varies from vehicle to vehicle or from batch to batch of mass production.

During learning in the dynamometer, the ECU 100 stores time buffer for each tooth 120. The ECU 100 captures/ records the time for individual tooth 120 for few complete rotations (e.g. in case of 2 rotations. 48 entries are recorded for a trigger wheel 110 having 24-2 configuration), When the engine is running at a constant speed, the ECU 100 models the profile of the trigger wheel 110 by assessing the time buffer of the tooth 120 and count of the tooth 120. Thus, the ECU 100 learns the deviation in each tooth 120, and gaps between every tooth 120. The learning is carried out at end of production line of the vehicle.

A plausibility check of the position sensor 102 (such as crankshaft position sensor) is done to assure the quality of the crankshaft signal. The maximum possible acceleration and deceleration is defined for a particular engine based on the range of engine speed. If the next tooth 120 is not detected within the time range, the position signal is considered invalid. The same is considered if the teeth are not uniformly spaced or are irregular. In both the scenarios, the plausibility check fails and stalls the vehicle. The ECU 100 is provided to prevent error due to faulty trigger wheel 110, i.e. the trigger wheel 110 with irregular or uneven teeth. In accordance to an embodiment of the present disclosure, the ECU 100 is provided for preventing failure in the plausibility check of the position sensor 102 due to irregularities in the trigger wheel 110.

After the production, the end of line test is conducted to verify the functioning of the position sensor 102. During this time the trigger wheel 110 learning is performed by the ECU 100. The vehicle is motored at a constant speed without fuel injection to prevent speed variation due to combustion and to keep the engine speed stable. At this time, the ECU 100 calculates and learns the width of each tooth (in degrees) based on the signal received from the position sensor 102 and stores in the table. The ECU 100 activates the plausibility check only after the learning of the trigger wheel 110. The ECU 100 then performs the plausibility check by using the table.

Once the table is ready with the tooth dimensions of all teeth of the trigger wheel 110, the ECU 100 is configured to detect a tooth 120 at anyone of a constant engine speed and a varying engine speed. The tooth number is detected or identified based on the gap present in the trigger wheel 110. Once the number of the tooth 120 is detected, the time range in which the subsequent tooth must be detected is known by the table stored in the memory element. Also, the time range comprises a minimum time and maximum time within which the tooth 120 must be detected. The time range is instantaneously calculated based on the varying engine speed. The time range is adapted as per the width of the detected tooth and/or the subsequent tooth.

Instead of having the same time range/timeout value for every tooth 120, the learned tooth width and gap together with the tooth count are used. Alternatively, only the tooth width is used. Therefore, the dynamic plausibility check fails, only if there is a real issue with the signal from the position sensor 102 apart from the prevailing properties of the trigger wheel 110. Here, the deviations on the trigger wheel 110 is learned by the ECU 100 and the plausibility check of the position sensor 102 is done considering the irregularities.

The FIG. 1 also depicts a pulse train which represents the detected tooth 120. A first tooth 104, a second tooth 106, a third tooth 108 and a fourth tooth 112 of all the tooth are shown, of which the second tooth 106 is having uneven/irregular width. The ECU 100 on detecting the first tooth 104, first checks the detection of the first tooth 104 within a respective time range, by referring to the table, and then also sets the time range for the detection of second tooth 106. No error is detected for the second tooth 106, as the time range is considered based on the actual tooth width and not the standard tooth width for a given configuration of trigger wheel 110. The pulse train is shown only for illustrations and must not be understood in limiting sense. If still the plausibility check of the position sensor 102 fails, then the failure is due to error in the position sensor 102 itself and not the trigger wheel 102.

In accordance to another embodiment of the present disclosure, the table storing actual tooth width is possible to be used for any computation within the vehicle. As a result, the determined engine position and, consequently, all events that are controlled by the engine position become more accurate.

Figure 2:
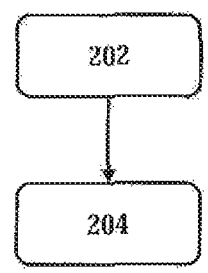
FIG. 2 illustrates a method for adapting the ECU for the irregularities in a trigger wheel, according to the present disclosure.

FIG. 2 illustrates a method for adapting the ECU for the irregularities in a trigger wheel, according to the present disclosure. The method comprising the steps of a step 202 comprising detecting a tooth 120 and corresponding tooth number by a position sensor 102, and a step 204 comprising setting a time range for the detection of a subsequent tooth 120 using the data from the table storing dimensions of the trigger wheel 110. If the subsequent tooth 120 is not detected within the set time range, then the controller 100 determines a fault in the position sensor 102.

The table is stored in memory element of the ECU 100. The dimensions of the trigger wheel 110 comprises tooth number and corresponding actual tooth width. The dimensions of the trigger wheel 110 are learned in a dynamometer at a constant engine speed without fueling. The tooth is detected at anyone of a constant engine speed and a varying engine speed.

According to an embodiment of the present disclosure, a method for adapting the ECU 100 to the irregularities in trigger wheel 110 is provided. The irregularities are generally due to production tolerance or defects. The present disclosure reinforces the ECU 100 or the Engine Position Management System (EPMS) with robust solution to prevent errors due to such irregularities, and rather adapts to the profile of the tooth 120. The present disclosure can be a part of standard end of line test which is done by all vehicle manufacturers. Further, a plausibility check considers changes in each tooth 120. Therefore, under normal condition the irregularities in the trigger wheel 110 will not give plausibility error. An error in plausibility check of the position sensor 102 is avoided due to irregularities in the trigger wheel 110. The plausibility error if missed during end of line testing, is possible to come at any time during the lifetime of the vehicle in real time driving conditions. The ECU 110 is adapted for the irregularities of the trigger wheel 110 and thus eliminates any scope of error due to the same.

It should be understood that embodiments explained in the description above are only illustrative and do not limit the scope of this disclosure, Many such embodiments and other modifications and changes in the embodiment explained in the description are envisaged. The scope of the disclosure is only limited by the scope of the claims.

We claim:

1. An Engine Control Unit (ECU), comprising:
   a memory element that stores a table of data including dimensions of a trigger wheel;
   wherein the ECU is configured to:
      use a position sensor to detect a tooth and a corresponding tooth number of the trigger wheel; and
      set a time range for an expected detection of a subsequent tooth of the trigger wheel with reference to the table of data stored in the memory element.

2. The ECU as claimed in claim 1, wherein the ECU is further configured to determine that the position sensor is faulty in response to a failure to detect the subsequent tooth within the set time range.

3. The ECU as claimed in claim 1, wherein:
   the dimensions of the trigger wheel stored in the table includes a tooth number value and a corresponding actual tooth width value measured and learned via a dynamometer.

4. The ECU as claimed in claim 3, wherein the corresponding actual tooth width value was measured using a constant engine speed without fueling.

5. The ECU as claimed in claim 1, wherein the ECU is configured to detect the tooth at a constant engine speed or at a varying engine speed.

6. A method for adapting an Engine Control Unit (ECU) to irregularities in a trigger wheel, comprising:
   using a position sensor to detect a tooth and corresponding tooth number of said trigger wheel; and
   setting a time range for an expected detection of a subsequent tooth with reference to a table of data that includes dimensions of the trigger wheel.

7. The method as claimed in claim 6; further comprising:
   determining that said position sensor is faulty in response to a failure to detect the subsequent tooth within said set time range.

8. The method as claimed in claim 6, wherein the dimensions of the trigger wheel in the data table include a tooth number value and a corresponding actual tooth width value.

9. The method as claimed in claim 6, wherein the dimensions of the trigger wheel were learned using a dynamometer at a constant engine speed without fueling.

10. The method as claimed in claim 6, wherein the detection of the tooth is performed at a constant engine speed or at a varying engine speed.

11. An Engine Control Unit (ECU), comprising:
- a memory element that stores a table of data including dimensions of a trigger wheel;
- wherein the ECU is configured to:
    - use a position sensor to detect a tooth of the trigger wheel:
    - identify a corresponding tooth number of the detected first tooth using the table of data; and
    - set a time range for an expected detection of a subsequent tooth of the trigger wheel based upon the identified first tooth using the table of data.

* * * * *